March 13, 1962 L. TABACK 3,025,000

FUNCTION GENERATOR FOR GENERATING A FUNCTION OF TWO INDEPENDENT VARIABLES

Filed Oct. 4, 1957

3 Sheets-Sheet 1

VOLTAGE CONTROLLED ATTENUATOR

VOLTAGE CONTROLLED ATTENUATOR

INVENTOR

Leonard Taback

BY

Arthur Umograd
Leonard F. Stoll

ATTORNEYS

ATTENUATOR APPROXIMATELY FULL ON

ATTENUATOR APPROXIMATELY HALF ON

ATTENUATOR APPROXIMATELY FULL OFF

INVENTOR
Leonard Taback

BY Arthur Vniozad
Leonard F. Stoll
ATTORNEYS

TRIANGULAR WAVE GENERATOR

OUTPUT SYSTEM

INVENTOR

Leonard Taback

BY Arthur Vinograd
Leonard F. Stoll

ATTORNEYS 3,025,000

FUNCTION GENERATOR FOR GENERATING A FUNCTION OF TWO INDEPENDENT VARIABLES

Leonard Taback, Mount Rainier, Md., assignor to the United States of America as represented by the Secretary of Commerce Filed Oct. 4, 1957, Ser. No. 688,384
6 Claims. (Cl. 235—197)

The present invention relates to the generation of function representing signals for use in connection with electrical analogue computers. Specifically, the invention contemplates an improved device for generating an arbitrary function of, for example, two independent variables.

The need of a function generating means in order to represent nonlinear phenomena for the simulation of physical problems in analogue computers is apparent. In general, function generators provide an output manifestation which varies in some arbitrary but controllable way in response to an applied input manifestation. In many instances the function generator must provide an output which is a function of two independent input variables. For example, in copending application, Serial No. 651,121, now Patent No. 2,998,193, for an Electronic Analogue Computer for Radioactive Fallout Prediction, filed on April 15, 1957, by H. K. Skramstad et al., which is assigned to the assignee of the present case, it is necessary to generate a particle radioactivity factor which is expressed as a function of two independent variables, height and time of particle fall. No familiarity with the mathematical functions underlying the radioactivity factor is necessary in accordance with the instrument of the present invention, since the function is incorporated in the instrument as a family of curves and it is necessary only to manipulate the controls in order to obtain any desired function within the range defined by the curves.

The usefulness of a function generator is measured by such characteristics as flexibility, that is, the difficulty of setting up the function generator and the ease with which it can be changed from one setup to provide different types of functions; frequency response, for example, the range of input and output frequencies which can be handled without introducing intolerable errors in either phase or magnitude; and finally, accuracy; or specifically, the manner in which the output conforms to the desired function. The present invention is intended to improve upon the deficiencies of prior art devices in connection with the above-enumerated criteria.

It is accordingly an immediate object of the present invention to provide a function generator for generating an arbitrary function of two independent variables which will work at electronic speeds and which is sufficiently flexible to be adaptable for the generation of a wide variety of optional functions.

It is a further object of this invention to provide a function generator which will accurately provide an output signal that conforms to any desired arbitrary function of two independent variables.

Another object of this invention is to provide a function generator which is completely electronic in operation.

Still another object of this invention is to provide a function generator which is adjustable in accordance with any desired function of two variables.

Other uses and advantages of the invention will become apparent upon reference to the specification and drawings in which.

Figure 2A:
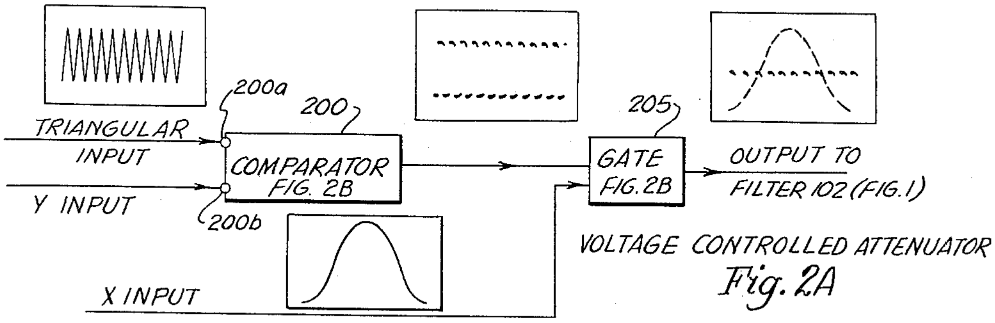
FIG. 2A is a functional block diagram illustrating the construction of a voltage-controlled pulsed attenuator employed in the present invention.
Figure 2B:
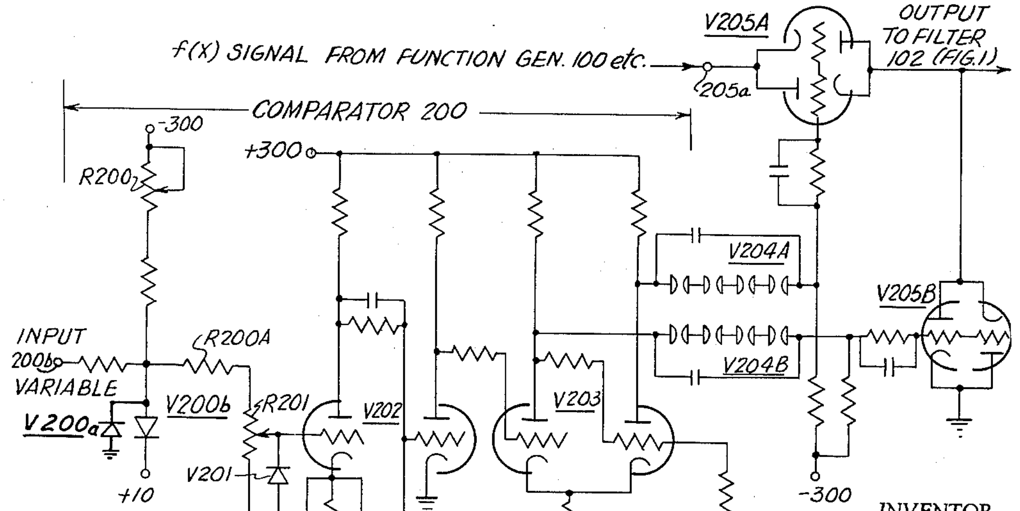
FIG. 2B is a schematic diagram detailing the circuit construction of the voltage-controlled pulsed attenuator of FIG. 2A.
Figure 2C:
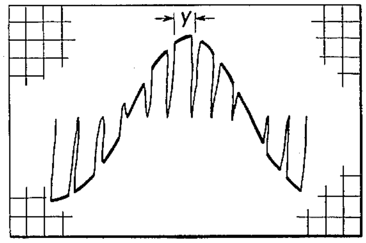
Figure 2D:
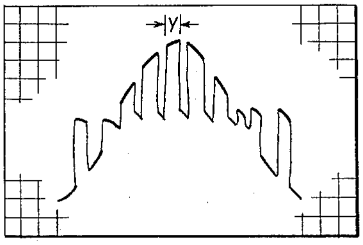
Figure 2E:
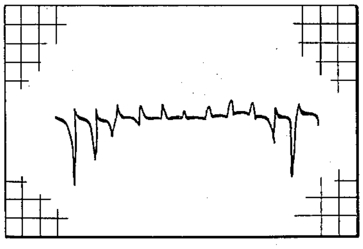
Figure 2F:
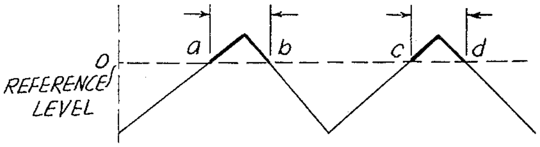
Figure 2H:
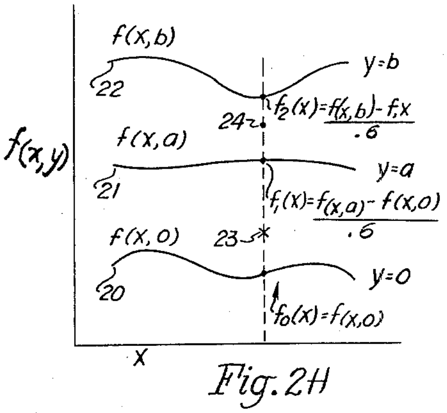
Figure 2G:
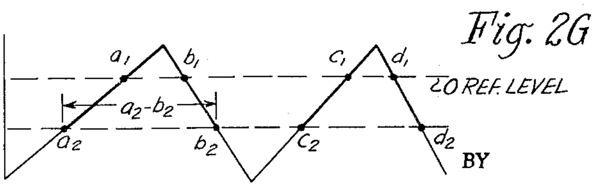
Figure 3:
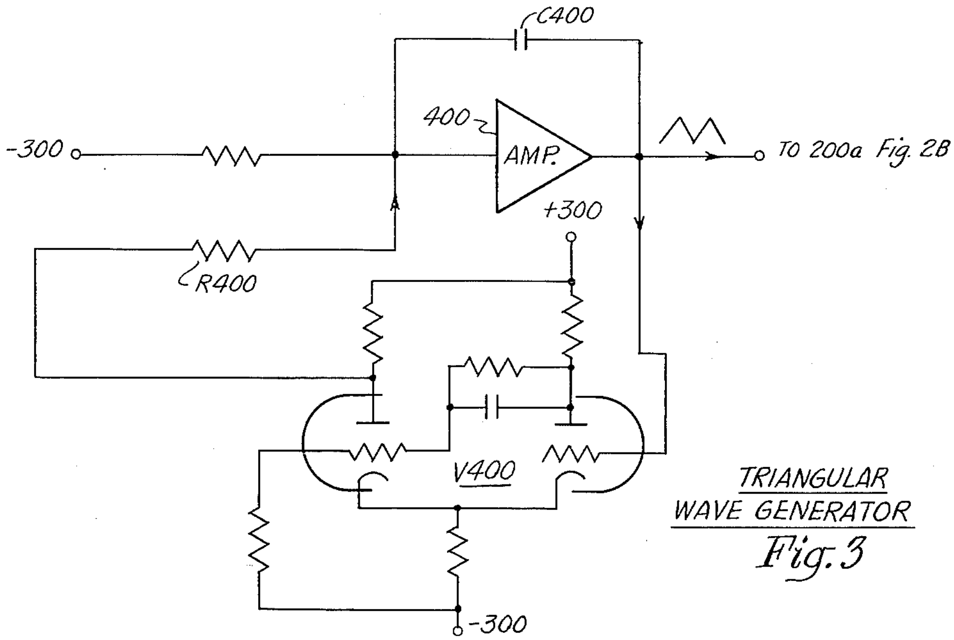
Figure 4:
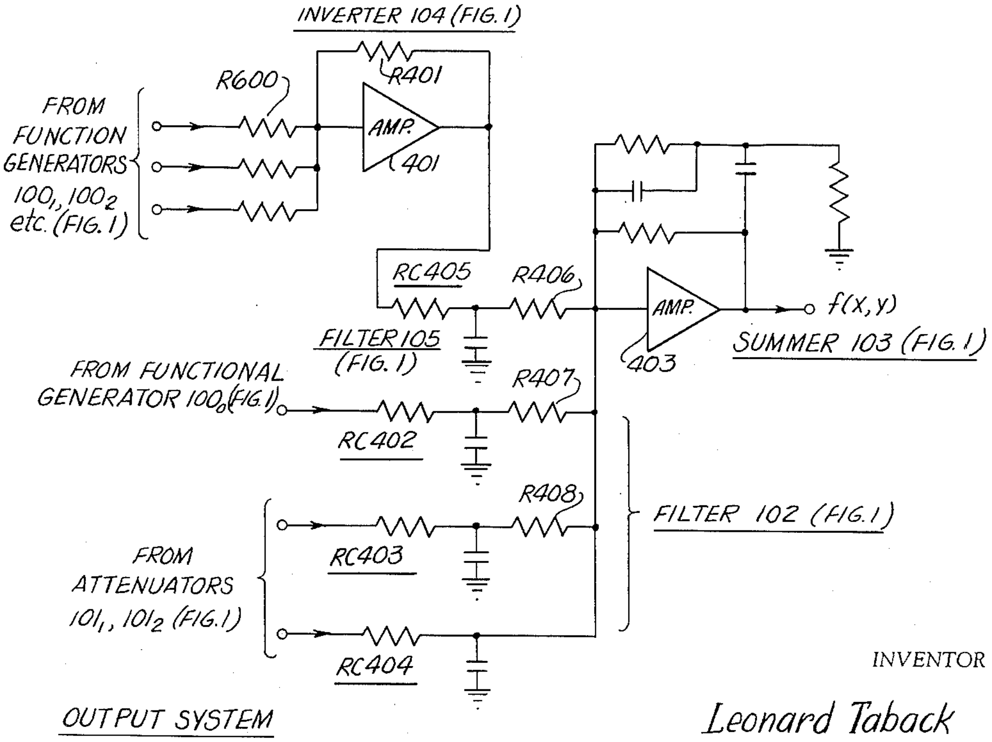

FIGS. 2C, 2D, and 2E are waveforms showing the operation of the voltage-controlled attenuator for various input settings;

FIGS. 2F, 2G are diagrams showing the principle of operation of the voltage-controlled attenuator;

FIG. 2H is an explanatory diagram;

FIG. 3 is a circuit diagram showing the construction of a triangular wave generator employed with the present invention; and FIG. 4 is a diagram of the output system employed.

Figure 1:
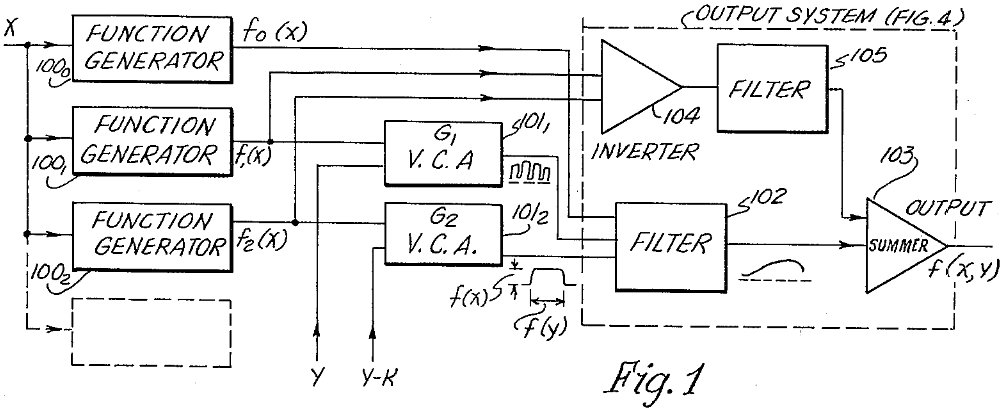
FIG. 1 is a block diagram illustrating the functional arrangement among the elements comprising the present invention.

The present invention contemplates a device comprising a number of individual mechanisms for generating functions of a first variable at successive fixed values of a second variable in combination with means for interpolating linearly among the function generators under control of one of said variables. An over-all block diagram of a preferred embodiment of the function generator in accordance with this invention is illustrated in FIG. 1. The apparatus comprises a plurality of individual function generators indicated as $100_0$, $100_1$, $100_2$, etc. each of which will produce or generate a different discrete function of an applied input variable $x$. The $x$ variable is in the form of a signal applied in parallel to the function generators $100_0$ through $100_2$ etc. While an embodiment employing three function generators is illustrated, as indicated in the broken line representation in FIG. 1, as many function generators as is desired can be incorporated in the apparatus of the present invention.

Each of the function generators $100_0$ etc. shown in FIG. 1 are of conventional type and are therefore only symbolically shown. A typically commercially available unit satisfactory for such purpose is the Goodyear Aircraft Company GN–215–N3 function generator. The output of each function generator $100_0$ through $100_2$ corresponds to an arbitrary function of $x$ such as $f_0(x)$, $f_1(x)$, $f_2(x)$, etc. The output of each function generator, except the first one, $100_0$, is applied to a respective voltage-controlled pulsed attenuator $101_1$, $101_2$, as indicated in FIG. 1.

Each function generator $100_0$ etc. will accordingly provide an output signal representing a different discrete function of the input signal representing the variable $x$.

Each of the voltage-controlled attenuators $101_1$, $101_2$ is a form of time division multiplier, the general principles of which are described on pages 223–226 of Electronic Analog Computers, by Korn and Korn. Each attenuator functions to combine the particular $f(x)$ signal generated by the function generators $100_1$, $100_2$ with a signal representing the second independent variable $y$ to provide an output which is a function of both $x$ and $y$.

The specific construction and mode of operation of such pulsed attenuators is fully discussed in connection with the description of FIG. 2. At this point in the description, however, it can be stated that each attenuator provides an output signal pulse having a duration proportional to the applied input variable ($y$), and an amplitude corresponding to $f(x)$, already referred to.

The outputs of the attenuators $101_1$, $101_2$, together with the output from the first function generator $100_0$, are applied to a filter circuit 102 which filters out any carrier signal introduced by the triangular wave employed in the operation of each of the attenuators as will be described. In this manner, a signal which represents a function of two independent variables $f(x,y)$ is obtained for application to a summer 103.

The signals representing function $f_1(x)$ and $f_2(x)$ generated by the function generators $100_1$ and $100_2$ are also applied to an inverter 104 and through a second filter 105 to the summer 103. The gain of the inverter amplifier 104 is less than one-half and provides an output which is subtracted from the signal applied to summer 103. The purpose of such subtractive effect is to compensate for residual signals which inherently arise from the function generators even when the outputs derived should be zero.

Each of the attenuators $101_1$, $101_2$ are energized sequentially as will be described in connection with the detailed description of FIGS. 2A and 2B.

Before considering the specific construction of the various elements of the invention, the principles underlying the apparatus diagrammatically shown in FIG. 1 will first be discussed.

A representative plot of a function of two independent variables, $x$ and $y$, is indicated in FIG. 2H. That is, each curve 20, 21, and 22 shows an arbitrary relation between variables $x$ and $y$ for different assumed values of $y$. The assumed value of $y$ in connection with curve 20 is 0 and the curve is accordingly designated $f(x, 0)$. Similarly, curves 21 and 22 are labeled $f(x,a)$ and $f(x,b)$, respectively, since they indicate the arbitrary relationship between $x$ and $y$ for assumed values in which $y$ equals $a$ and $b$, respectively. It will be understood that any desired number of curves showing various degrees of relationship between $x$ and $y$ can be plotted in this manner.

Considering for the moment the block diagram of FIG. 1, it will be apparent that the output signal derived from the apparatus of this invention is composed of the summation of the outputs of the various voltage-controlled attenuators $101_1$, $101_2$ etc. and the output from inverter amplifier 104 together with its associated filter 105. The output, $f(x, y)$ can be expressed as $$f(x, y)=f_0(x)+G_1f_1(x)+G_2f_2(x)+\ldots -Af_1(x)-Af_2(x) \quad (1)$$

or $$f(x, y)=f_0(x)+[G_1-A]f_1(x)+[G_2-A]f_2(x) \text{ etc.} \quad (2)$$

where A is the gain of the inverting amplifier and filter combination 104, 105 and has an approximate value of .2.

The values of $G_1$, $G_2$, etc., the respective gains of the voltage-controlled attenuators $101_1$, $101_2$, lie between .2 and .8, the gains being controlled by the independent input variable $y$ in the following manner.

The values of the gain $G_1$ are $$\left.\begin{array}{l} G_1=\frac{y}{a} \text{ for } 0<y<a \\ G_1=.2 \text{ for } y<0 \\ G_1=.8 \text{ for } y>0 \end{array}\right\} \quad (3a)$$

The values of the gain $G_2$ are $$\left.\begin{array}{l} G_2=\frac{(y-a)(.6)}{b}+.2 \text{ for } a<y<(a+b) \\ G_2=.2 \text{ for } y<a \\ G_2=.8 \text{ for } y>(a+b) \end{array}\right\} \quad (3b)$$

Substituting the values of $G_1$, $G_2$, etc. from Equations 3*a*, 3*b* in Equation 2:

$$f(x, y)=f_0(x)+\frac{.6y}{a}f_1(x)+\frac{.6(y-a)}{b}f_2(x) \text{ etc.} \quad (4)$$

Returning to a consideration of FIG. 2H in which each of the curves represents a particular value of $y$ held at an arbitrary constant 0, $a$, $b$, etc., in order to obtain a value corresponding to $f(x, y)$ the following equations must be satisfied $$f_0(x)=f(x, 0) \quad (5a)$$

$$f_1(x)=\frac{f(x, a)-f(x, 0)}{.6} \quad (5b)$$

$$f_2(x)=\frac{f(x, b)-f_1(x)}{.6} \text{ etc.} \quad (5c)$$

It will be apparent that Equations 5*a*–5*c* specify the settings of the corresponding function generators $100_0$, $100_1$, and $100_2$.

The Equations 5*a*–5*c* are general, permitting the adjustment for a function $f(x, y)$ using any desired $y$ increment. However, it is simpler to set the function generators for equal increments $k$. Combining the above Equations 5*a*–5*c* and making the increments equal to $k$:

$$f(x,y)=f_0(x,0)+\frac{y}{k}[f(x,k)-f(x,0)]+\frac{y-k}{2k}[f(x,2k)-f(x,k)] \quad (6a)$$

which may be expressed in terms of the outputs of the function generators thus $$f(x,y)=f_0(x)+\frac{y}{k}f_1(x)+\frac{y-k}{k}f_2(x) \quad (6b)$$

For any selected value of $x$ indicated by the broken line in FIG. 2H, the value of $f(x, y)$ represented on each of the curves 20, 21, and 22 is $f_0(x)$, $f_1(x)$ and $f_2(x)$, respectively. It will be obvious that if the function generators $100_0$, $100_1$, and $100_2$ shown in FIG. 1 were set to obtain such values respectively, in accordance with Equations 5*a*–5*c* the apparatus would be able to provide a $f(x, y)$ for three different fixed values of $y$. It will also be obvious that by the addition of sufficient function generators as symbolized in broken lines in FIG. 1 to represent additional curves (FIG. 2H), the apparatus can be employed to implement almost any arbitrary function of two independent variables such as $f_3(x)$, $f_n(x)$, etc.

The use of function generators alone is, however, neither sufficient nor economical in the attainment of a high degree of selectivity of a desired function. The apparatus of the present invention therefore also provides means for interpolating for values lying between those represented by the curves in FIG. 2H.

The feature for accomplishing interpolation in accordance with the present invention is based on the following considerations. As is well known, interpolation for a point $y$, the value of which is $f(y)$, between two values $f(a)$ and $f(b)$ for values of the variable equal to $a$ and $b$ respectively is obtained as follows:

$$f(y)=f(a)+\frac{y}{b-a}[f(b)-f(a)] \ldots \quad (7)$$

for fixed increments $k$ and $a=0$ $$f(y)=f(0)+\frac{y}{k}[f(k)-f(0)] \ldots \quad (7a)$$

For a given value of X Equation 6*a* reduces to Equation 7*a* thereby showing that the device linearly interpolates along the $y$ axis.

The various functions of $x$ for example, $f_0(x)$, $f_1(x)$, $f_2(x)$, designated in FIG. 2H may readily be generated by the respective function generator $100_0$, $100_1$, $100_2$, etc. shown in FIG. 1. The respective functions are indicated in FIG. 1 as output signals from each function generator. The respective attenuators 101, $101_2$ connected to the outputs of the $f_1(x)$ function generator $100_1$ and $f_2(x)$ function generator $100_2$, provide respectively, interpolation by modifying such input signals in accordance with the $$\frac{y}{k}, \frac{y-k}{k}$$

factors defined in Equation 6. As will be described in detail, each such attenuator receives signals corresponding to $f_1(x)$, $f_2(x)$ and modifies such signal with a second applied signal corresponding to $$\frac{y}{k}, \frac{y-k}{k}$$

etc., to provide an output corresponding to $$\frac{y}{k}, f_1(x) \text{ and } \frac{y-k}{k}f_2(x)$$

respectively. The unmodified $f_0(x)$ signal from function generator $100_0$ together with the respective outputs from attenuators 101 and $101_2$ are then accumulated in summer 103 to provide an output signal corresponding to Equation 6*b*; namely, $$f_0(x)+\frac{y}{k}f_1(x)+\frac{y-k}{k}f_2(x)$$

*Voltage-Controlled Pulsed Attenuators*

The construction and operation of the voltage-controlled pulled attenuators $101_1$, $101_2$ designated in FIG. 1 is detailed in connection with the block diagram of FIG. 2A, the detailed circuit diagram of FIG. 2B, and the waveforms illustrated in FIGS. 2C–2F. Referring to FIG. 2A each attenuator comprises a comparator 200 to which there is applied both a repetitious triangular input signal to input terminal 200*a* and another input signal to terminal 200*b* representing the *y* variable which is also shown in FIG. 1. The output of the comparator is applied to a gate circuit 205 coincidentally with the $f(x)$ signal obtained from an appropriate one of the function generators $100_1$, $100_2$. The output of the gate circuit 205 is applied to the filter 102 shown in FIG. 1. The waveform of the signals are indicated in FIG. 2A adjacent each of the circuit components.

The construction and operation of the voltage-controlled attenuator can be explained by considering the waveform shown in FIG. 2F of the drawings. The triangular shaped wave shown in FIG. 2F corresponds to the triangular input carrier signal indicated in the block diagram of FIG. 2A. The triangular wave illustrated in FIG. 2F is shown relative to a zero voltage reference level indicated by the broken line in FIG. 2F. As will be described, the comparator in each voltage-controlled attenuator is a device which is controlled by the triangular wave so that it will conduct at voltage conditions defined by the portions of the triangular wave which are above the zero reference level indicated in FIG. 2F.

Specifically, conduction will be obtained in the regions defined by the rising and falling portions of the triangular wave included between points *a* and *b* and between points *c* and *d*, respectively. It will therefore be obvious that the resulting output signal will have a duration or pulse width corresponding to the distances *a–b*, and *c–d* indicated in FIG. 2F. It will also be apparent that each such pulse will necessarily occur at a frequency defined by the frequency of the triangular wave. The comparator therefore functions as an on-off device which generates a pulse having a width or duration corresponding to the distances *a–b*, *c–d*, etc.

By shifting the triangular wave relative to the reference level, it will be apparent that the duration or width of the output pulse can be selectively varied. Such action is illustrated in FIG. 2G. The upper reference level line corresponds to the 0-voltage reference level line indicated in FIG. 2F, while the lower reference level line indicates the result obtained when the level of the triangular wave is increased relative to the reference level. It will be obvious from FIG. 2G that the desired pulse width will increase from an amount corresponding to $a_1–b_1$ to an amount corresponding to $a_2–b_2$ consequent to a shift in the reference level. The "*y*" input signal designated in FIG. 2A provides the described effect of shifting the amplitude of the triangular wave in the manner indicated in FIGS. 2F and 2G. The variable "*y*" will therefore determine the duration of the derived pulse signal. Stated in another way, the pulse width will correspond to the factor "*y*."

FIG. 2B shows a circuit diagram implementing the mechanism diagrammatically shown in FIG. 2A. The portions of the circuitry shown in FIG. 2B corresponding to the blocks indicated in FIG. 2A are labeled with corresponding reference numerals. The comparator 200 comprises an attenuator circuit including diodes V200*b*, V201, a D.C. amplifier comprising the twin triode V202, V203 and banks of neon tubes V204A, V204B. The gate circuit 205 symbolically indicated in FIG. 2A is representative in FIG. 2B by the series gate tube V205A and parallel gate tube V205B. The "*y*" input variable is applied at input terminal 200*b* shown at the left-hand portion of FIG. 2B, while the triangular carrier signal obtained from the mechanism of FIG. 3 to be described is applied at terminal 200*a*. The voltage corresponding to the input variable "*y*" applied at terminal 200*b* is limited to a potential between 0 and +10 volts above ground by the 10-volt bias on the cathode of the diode of V200*b* and the inversely connected diode V200*a*. The diode V201 prevents the grid of the left-hand section of the D.C. amplifier V202 from going negative. A potentiometer R200 is connected to a —300-volt source as indicated and therefore provides an adjustable means for determining the point at which the anode terminal of diode V200*b* will be positive. In this manner adjustment of the corresponding potentiometer R200 in each attenuator determines the amplitude value of the applied "*y*" signal that will result in energization of the attenuator. The attenuator $101_1$, $101_2$ may thereby be energized in sequence depending on the amplitude of the respective *y*, *y–k*, etc. signals applied. The resistors R200A and R200B comprise summing resistors.

When the *y* input variable voltage applied to terminal 200*b* reaches a value large enough to make the left-hand grid of D.-C. amplifier V202 positive, the resulting signal is amplified and applied to a gate driver tube V203. The gate driver tube V203 comprises a bistable circuit which is adapted to be driven to either of two states of conductivity by the signal applied to the left-hand grid of the amplifier V202. That is, when a positive signal is applied to the left-hand grid of V202, a positive signal will also be applied to the left-hand grid of the gate driver V203. Accordingly, the plate of the right-hand section of gate driver V203 will be positive and such positive signal will be transmitted through the upper chain of neon tubes V204A to the series gate tube V205A. The $(x)$ input signal applied to terminal 205*a* of the gate will therefore be transmitted through the series gate tube V205A to the filter 102 shown in the block diagram of FIG. 1. In other words, under the above-described conditions, the $f_1(x)$ output of the particular function generator $100_1$ applied to terminal 205*a* of the voltage-controlled attenuator appears at the output of the gate.

Similarly, if the resulting signal applied to the left-hand grid of the D.-C. amplifier V202 is negative then the plate of the right-hand section of the D.-C. amplifier will be negative and the resulting negative signal applied to the left-hand section of the gate driver V203 will cause the bistable V203 to flip. The resulting negative signal obtained at the plate of the right-hand section of the V203 and applied through the chain of neon tubes V204A to the grid of the V205A gate will cut that tube off. As a consequence the positive signal derived at the left-hand plate of the gate driver V203 will be applied through the lower chain of neon tubes V204B to energize the shunt gate V205B. The applied $f(x)$ signal from the function generator will now be cut off by the series gate and the shunt gate will maintain a low impedance at the input of the filter.

From the above description, it will be clear that the polarity of the *y* input variable signal determines both the duration of conduction of the series gate V205A and energization of the shunt or cutoff gate V205B. The output pulse obtained from the voltage-controlled attenuator therefore will have a duration determined by the *y* input variable. Since the $f(x)$ signal from the function generator is conducted through the series gate V205A, the amplitude of such output pulse signal will be determined by the *x* variable. Figs. 2C, 2D, and 2E are typical oscilloscope traces showing the output obtained from each voltage-controlled attenuator. Since the output signal is modulated by the triangular wave input as described, the output produced comprises a series of pulses having an envelope corresponding to the output of the function generator. The width of each pulse comprising the envelope as shown in FIGS. 2C, 2D, and 2E corresponds to the $y$ input variable. FIGS. 2C, 2D, and 2E also illustrate the effect of adjusting the attenuator from a full-on condition to a full-off condition.

*Triangular Wave Generator*

The triangular wave generator employed for generating the referred-to triangular wave input signal applied to the voltage-controlled attenuator of FIG. 2B is illustrated in FIG. 3. The triangular wave generator comprises a conventional operational amplifier 400 connected as an integrator by means of the capacitor C400. A bistable device comprising the twin triode V400 controls the input signal of the operational amplifier. Assuming that the left-hand section of the tube V400 is conducting, then the plate signal output of the left-hand section will be negative and the output of the integrator circuit comprising the operational amplifier 400 will increase linearly at a rate determined by a summing resistor R400 and the capacitor C400. The output of the operational amplifier is connected to the grid of the right-hand section of the twin triode V400 and therefore as the output of the integrator increases positively, the right-hand section of the tube V400 will consequently be turned on thereby extinguishing the left-hand section in a conventional manner. The resulting positive signal output obtained from the left-hand section of the two triode applied to the integrator comprising operational amplifier 400 will therefore result in a linearly decreasing signal. The resulting output of the generator circuit shown in FIG. 3 is therefore a triangular wave as indicated adjacent the output terminal. Such output signal comprises the triangular wave input applied at terminal 200*a* in FIG. 2B.

*Output System*

The portion of the block diagram included in the broken line outline in FIG. 1 comprising the output system and is further detailed in FIG. 4 of the drawings. The outputs from the function generators $\mathbf{100}_1$, $\mathbf{100}_2$ etc. are applied through appropriate summing resistors R600 to amplifier 401 which together with resistor R401 comprises inverter 104 designated in FIG. 1. As indicated in FIG. 1 the output of the first function generator $\mathbf{100}_0$ as well as the outputs from each of the voltage-controlled attenuators $\mathbf{101}_1$, $\mathbf{101}_2$ are applied to the filter 102. Such construction is detailed in FIG. 4 in which the filter 102 is represented by the RC combinations RC402, RC403, and RC404 to which the outputs of function generator $\mathbf{100}_0$ and attenuators $\mathbf{101}_1$, $\mathbf{101}_2$, respectively, are applied. The filter 105 designated in FIG. 1 is indicated by an RC network RC405 in FIG. 4 to which the output of the inverter is applied. The resulting outputs from all the referred-to filters are applied through appropriate summing resistors R406, R407, and R408 to the summer 103 which comprises an operational amplifier 403. The output accordingly comprises a signal representing an arbitrary function of the variables $x$ and $y$, as derived in accordance with the above-detailed description.

It will be recalled from the description of FIG. 2, that the output waveform of the voltage-controlled pulsed attenuators $\mathbf{100}_1$, $\mathbf{100}_2$, etc., includes the triangular wave carrier signal generated by the triangular wave generator. The filter 102 shown in FIGS. 1 and 4 functions to partially filter out such carrier signal so that the signal applied to the summer 103 is essentially similar to the outputs of the function generator.

It will be clear from the above description that the function generator of the present invention is completely electronic in operation. It operates satisfactorily at signal frequencies up to 100 c.p.s. and a high degree of function selectivity is obtainable because of the flexibility in the number of individual function generators that can be used. While linear interpolation is employed it will be apparent from the description that nonlinear interpolation is obtainable by suitable shaping of the sawtooth signal. The device operates at electronic speeds, limited only by the sawtooth frequency as this frequency determines the design of the filters.

It will be apparent that the embodiments shown are only exemplary and that various modifications can be made in construction and arrangement within the scope of invention as defined in the appended claims.

What is claimed is:

1. A device for generating an output signal representing a function of two independent variables comprising: first means responsive to a first input signal representing a first of said variables for generating a signal which is an arbitrary function of said first variable for a fixed value of said second variable, second means responsive to said first input signal for generating signals representing additional functions of said first variable for corresponding fixed values of said second variable, third means responsive to said additional function generating means and to second input signals representing discrete values of said second variable for providing output signals proportional to a function of said signals generated by said second means and said second variable signals and means for cumulatively combining the outputs of said first and third means to provide an output signal which is a function of said two variables.

2. The invention of claim 1 in which said third means comprises a pulse generator for providing an output pulse having a duration corresponding to said second variable and an amplitude corresponding to said first variable.

3. The invention of claim 2 including a triangular wave generator and comparator means in said pulse generator responsive to said triangular wave generator and said second variable signal for determining the duration and frequency of said output pulse.

4. The invention of claim 3 including a plurality of said pulse generators each connected to a respective one of said additional function generating means, and amplitude sensitive means in each of said pulse generators responsive to said second variable signal for energizing each of said pulse generators in sequence.

5. The invention of claim 4 including a filter for said triangular wave signal connecting said pulse generators to said combining means.

6. The invention of claim 5 including means for inverting the outputs of said second means and a second triangular wave signal filter connecting said inverting means to said combining means.

References Cited in the file of this patent

UNITED STATES PATENTS

| | | |
|---|---|---|
| 2,773,641 | Baum | Dec. 11, 1956 |
| 2,794,965 | Yost | June 4, 1957 |
| 2,801,351 | Calvert et al. | July 30, 1957 |
| 2,878,999 | Lindsey et al. | Mar. 24, 1959 |

OTHER REFERENCES

Amemiya: A New Diode Function Generator, I.R.E. Trans. on Electronic Computers, June 1957, pages 95–97.

Model F2V Function of Two Variables (Philbrick), received in Div. 23, December 11, 1957, pages 1–15.

A Palimpsest on the Electronic Analog Art (Paynter), 1955; pages 266–270.